United States Patent
Oketani

(10) Patent No.: US 8,179,777 B2
(45) Date of Patent: May 15, 2012

(54) TRANSMITTER AND RECEIVER FOR A WIRELESS ACCESS SYSTEM, TRANSMISSION METHOD AND RECEPTION METHOD OF THE WIRELESS ACCESS SYSTEM, AND A PROGRAM FOR SAME

(75) Inventor: Kengo Oketani, Tokyo (JP)

(73) Assignee: NEC Corporation, Tokyo (JP)

( * ) Notice: Subject to any disclaimer, the term of this patent is extended or adjusted under 35 U.S.C. 154(b) by 461 days.

(21) Appl. No.: 12/528,145

(22) PCT Filed: Jan. 22, 2009

(86) PCT No.: PCT/JP2009/050924
§ 371 (c)(1),
(2), (4) Date: Aug. 21, 2009

(87) PCT Pub. No.: WO2009/093628
PCT Pub. Date: Jul. 30, 2009

(65) Prior Publication Data
US 2010/0098189 A1    Apr. 22, 2010

(30) Foreign Application Priority Data
Jan. 22, 2008    (JP) ................... 2008-011912

(51) Int. Cl.
*H04J 11/00* (2006.01)
(52) U.S. Cl. ............... 370/203; 370/208; 341/173
(58) Field of Classification Search .......... 370/203, 370/208; 341/173–174
See application file for complete search history.

(56) References Cited

U.S. PATENT DOCUMENTS
2008/0232493 A1*  9/2008  Zhang et al. ................. 375/260

FOREIGN PATENT DOCUMENTS
| JP | 2003099244 A | 4/2003 |
| JP | 3507119 B | 12/2003 |
| JP | 2004126872 A | 4/2004 |
| JP | 2004253899 A | 9/2004 |
| JP | 2005072843 A | 3/2005 |
| JP | 2007151059 A | 6/2007 |

OTHER PUBLICATIONS

International Search Report for PCT/JP2009/050924 mailed Feb. 24, 2009.
3GPP TS 36.211 V2.0.0, Technical Specification Group Radio Access Network, Evolved Universal Terrestrial Radio Access (E-UTRA), Physical Channels and Modulation (Release 8), Sep. 2007.
Panasonic, NTT DoCoMo, "Reference signal generation method for E-UTRA uplink", 3GPP TSG RAN WG1 Meeting #50, Aug. 20-24, 2007.

* cited by examiner

*Primary Examiner* — Kevin C Harper

(57) ABSTRACT

An arithmetic process of a quadratic formula that is contained in an exponent of a CAZAC sequence-defining expression is converted to an arithmetic process of a recursion formula to find the above-described exponent, the above-described exponent that was found is used to generate a CAZAC sequence, and the above-described CAZAC sequence that was generated is taken as the reference signal for transmitting and receiving or as a random access preamble signal.

25 Claims, 10 Drawing Sheets

TRANSMITTER AND RECEIVER FOR A WIRELESS ACCESS SYSTEM, TRANSMISSION METHOD AND RECEPTION METHOD OF THE WIRELESS ACCESS SYSTEM, AND A PROGRAM FOR SAME

This application is the National Phase of PCT/JP2009/050924, filed Jan. 22, 2009, which claims priority based on Japanese Patent Application No. 2008-11912 for which application was submitted on Jan. 22, 2008 and incorporates all of the disclosures of that application.

TECHNICAL FIELD

The present invention relates to a transmitter and receiver for a wireless access system.

BACKGROUND ART

In the LTE (Long Term Evolution) of the 3GPP ($3^{rd}$ Generation Partnership Project), single-carrier FDMA has been adopted as an uplink wireless access mode (3GPP TS 36.211 V2.0.0, 2007-09, Page 15, paragraph 5.5.1.1). In 3GPP LTE, a reference signal is transmitted for the purpose of estimating CQI (Channel Quality Information) for uplink scheduling or estimating a channel for data demodulation on the reception side.

As such a reference signal, the use of a Zadoff-Chu sequence, which is one CAZAC (Constant Amplitude Zero Auto-Correlation) sequence, is prescribed in 3GPP LTE. In addition, a similar Zadoff-Chu sequence is also used for the preamble signal in random access. Still further, a similar Zadoff-Chu sequence is also used for the reference signal that is transmitted together with the data signal during data channel transmission.

A "CAZAC sequence" here is a sequence having a constant amplitude in both the time domain and frequency domain, and moreover, in which the periodic auto-correlation value is always zero with respect to time shifts other than 0 (zero auto-correlation). A CAZAC sequence is a sequence in which the PAPR (Peak to Average Power Ratio) is suppressed to a low level because it has constant amplitude in the time region, and further, that is suitable for propagation path estimation in the frequency domain due to its constant amplitude in the frequency domain.

The low PAPR as described hereinabove means that power consumption is suppressed to a low level, this feature being a particularly desirable property in mobile communication. Further, the complete auto-correlation characteristic is suited for the detection of the timing of a received signal or the detection of a user signal in random access.

The sequence-defining expression of a Zadoff-Chu sequence that is used as the preamble for a random access channel and that is prescribed in 3GPP LTE is represented by Formula 1:

$$X_u(n) = e^{-j\frac{\pi u n(n)}{N_{zc}}}, \quad \text{Formula 1}$$

$$n = 0, 1, \ldots, N_{zc} - 1$$

Here, u is the sequence number and $N_{zc}$ is the sequence length. In addition, the value of sequence number u that can be taken is a natural number that is less than the sequence length Nzc, i.e., u=1, ..., Nzc−1.

Thus, a CAZAC sequence is a sequence-defining expression that includes a quadratic formula relating to n in the numerical expression that is superscript in an exponent.

DISCLOSURE OF THE INVENTION

In mobile communications such as cellular communications, a CAZAC sequence such as a Zadoff-Chu sequence that is defined by an expression that includes a quadratic formula relating to n in an exponent must be generated in each terminal/base station for uplink random access transmission/reception or for reference signal transmission/reception of a data channel. However, as described below, problems arise when generating a CAZAC sequence in accordance with a sequence-defining expression.

In the numerical expression that is superscript in the exponential of a sequence-defining expression, a quadratic formula relating to n is included, and division by means of the sequence length Nzc is also included, whereby multiplication and division for all n (=0, 1, ..., Nzc−1) is necessary to carry out sequence generation. In other words, a number of times of multiplication and division that is proportional to sequence length Nzc is required to carry out sequence generation, raising the problem that the required computation amount is extremely voluminous.

It is an object of the present invention to provide a transmitter/receiver of a wireless access system, a transmission method/reception method of a wireless access system, and a program that can solve the above-described problems.

The transmitter of the wireless access system of the present invention is provided with:

an arithmetic unit for converting an arithmetic process of a quadratic formula that is contained in an exponent of a CAZAC sequence-defining expression to an arithmetic process of a recursion formula that is obtained according to the periodicity of the CAZAC sequence-defining expression to find the exponent;

a sequence generation unit for using the exponent found by the arithmetic unit to generate a CAZAC sequence; and a transmission unit for transmitting the CAZAC sequence that was generated in the sequence generation unit as a reference signal of a data signal or as a random access preamble signal.

The receiver of the wireless access system of the present invention is provided with:

an arithmetic unit for converting an arithmetic process of a quadratic formula contained in an exponent of a CAZAC sequence-defining expression to an arithmetic process of a recursion formula obtained according to the periodicity of the CAZAC sequence-defining expression to find the exponent;

a sequence generation unit for using the exponent that was found by the arithmetic unit to generate a CAZAC sequence; and a reception unit for receiving a reference signal of a data signal or a random access preamble signal made up by the identical sequence as the CAZAC sequence and using the CAZAC sequence that was generated in the sequence generation unit and the reference signal of the data signal or the random access preamble signal to detect the data signal or random access user.

The transmission method of the wireless access system of the present invention is characterized by:

converting an arithmetic process of a quadratic formula contained in an exponent of a CAZAC sequence-defining expression to an arithmetic process of a recursion formula that is obtained according to the periodicity of the CAZAC sequence-defining expression to find the exponent;

using the exponent that was found by the arithmetic process of a recursion formula to generate a CAZAC sequence; and transmitting the CAZAC sequence as the reference signal of a data signal or as the random access preamble signal.

The reception method of the wireless access system of the present invention is characterized by: converting an arithmetic process of a quadratic formula contained in an exponent of a CAZAC sequence-defining expression to an arithmetic process of a recursion formula obtained according to the periodicity of the CAZAC sequence-defining expression to find the exponent;

using the exponent that was found in the arithmetic process of a recursion formula to generate a CAZAC sequence;

receiving a reference signal of a data signal or the random access preamble signal that is composed of the same sequence as the CAZAC sequence; and using the CAZAC sequence and the reference signal or the random access preamble signal to detect the data signal or random access user.

The first program of the present invention causes a computer to execute processes of:

converting an arithmetic process of a quadratic formula contained in an exponent of a CAZAC sequence-defining expression to an arithmetic process of a recursion formula obtained according to the periodicity of the CAZAC sequence-defining expression to find the exponent;

using the exponent that was found in the arithmetic process of a recursion formula to generate a CAZAC sequence; and transmitting the CAZAC sequence as the reference signal of a data signal or as the random access preamble signal.

The second program of the present invention causes a computer to execute processes of:

converting an arithmetic process of a quadratic formula that is contained in an exponent of a CAZAC sequence-defining expression to an arithmetic process of a recursion formula that is obtained according to the periodicity of the CAZAC sequence-defining expression to find the exponent;

using the exponent that was found in the arithmetic process of a recursion formula to generate a CAZAC sequence;

receiving the reference signal of a data signal or the random access preamble signal that is composed of the same sequence as the CAZAC sequence; and using the CAZAC sequence and the reference signal or the random access preamble signal to detect the data signal or random access user.

According to the present invention, the multiplication and division that were necessary when generating a sequence according to a sequence-defining expression can be completely eliminated, a CAZAC sequence can be generated by means of addition and subtraction, and the necessary computation amount and circuit scale can be drastically reduced.

Figure 1:
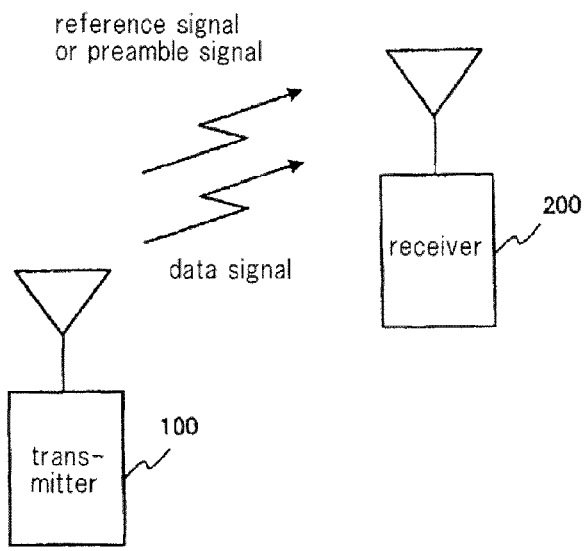
FIG. 1 is a block diagram showing the configuration of the wireless access system of the present invention.

EXPLANATION OF REFERENCE NUMBERS 10, 20 CAZAC sequence generation device
11, 21 arithmetic unit
13, 15 transmission unit
23, 25 reception unit
100 transmitter
101 data signal generation unit
102 reference (or preamble) signal generation unit
103 DFT unit
104 subcarrier mapping unit
105 IFFT unit
106 cyclic prefix appending unit
111, 211 storage unit initial value (update value) storage memory (storage unit)
112, 212 R(n) update unit
113, 213 P(n) update unit
114 integer portion cut-out unit
121, 221 trigonometric function value converter
122, 222 CAZAC sequence generation unit 121, 221 reference unit (cosine table reference unit)
121 reference unit (cosine table reference unit)
122 CAZAC sequence generation unit
200 receiver
201, 211 cyclic prefix deletion unit
203, 212, 213 FFT unit
204, 214, 215 subcarrier demapping unit
205 preamble signal generation unit
206 preamble signal multiplier
207 user signal detection unit
216 reference signal generation unit
217 reference signal multiplier
218 channel estimation unit
219 data equalizer
220 demodulator
231 reception means
232 multiplication means
233 output means
1121, 1131 adder
1211 first arithmetic unit
1213 second arithmetic unit
1212, 1214 cosine table Cos Tbl
1221, 1222 selector

BEST MODE FOR CARRYING OUT THE INVENTION

An embodiment of the present invention is next described with reference to the accompanying figures.

First Embodiment

First, a wireless access system such as a single-carrier transmission system that is the object of application of the invention is next described.

FIG. 1 shows the configuration of the wireless access system of the present invention. A wireless access system such as a single-carrier transmission system is made up from transmitter 100 and receiver 200. In the wireless access system, transmitter 100 generates a reference signal and transmits this generated reference signal to receiver 200. Receiver 200 generates a reference signal for data demodulation. This reference signal that is generated in receiver 200 is identical to the reference signal that was generated in transmitter 100.

In addition, transmitter 100 generates a preamble signal and transmits this generated preamble signal to receiver 200. In receiver 200, a preamble signal is generated and this preamble signal then used for such purposes as detecting a random access user. A CAZAC sequence such as a Zadoff-Chu sequence is used as the reference signal and preamble signal.

Figure 2A:
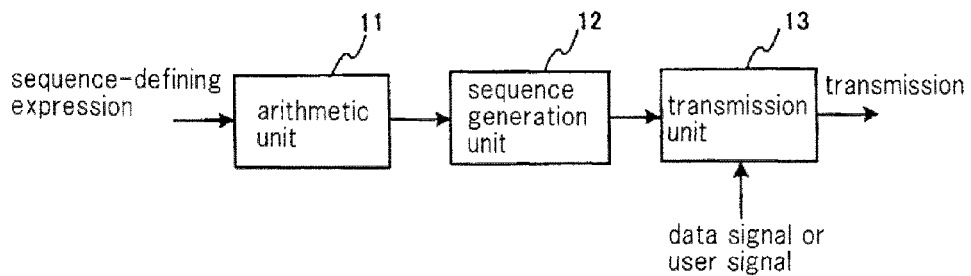
FIG. 2A is a block diagram showing the configuration of the transmitter of the wireless access system of the first embodiment of the present invention.
Figure 2B:
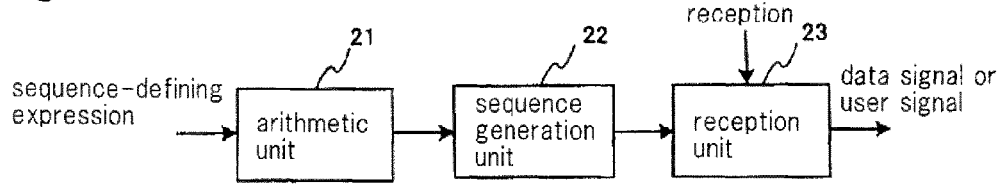
FIG. 2B is a block diagram showing the configuration of the receiver of the wireless access system of the first embodiment of the present invention.
Figure 3A:
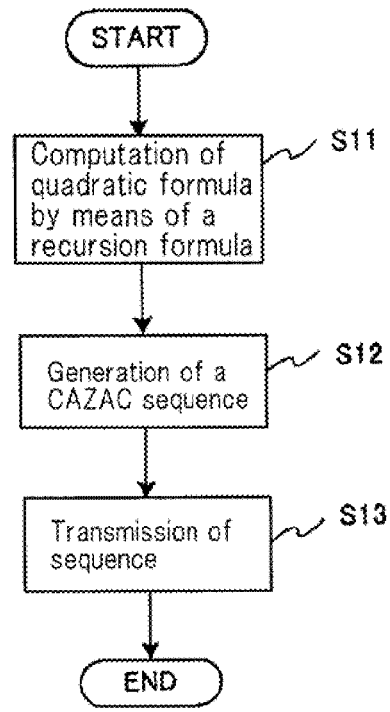
FIG. 3A is a flow chart showing the transmission processing method that is carried out in the transmitter shown in FIG. 2A.
Figure 3B:
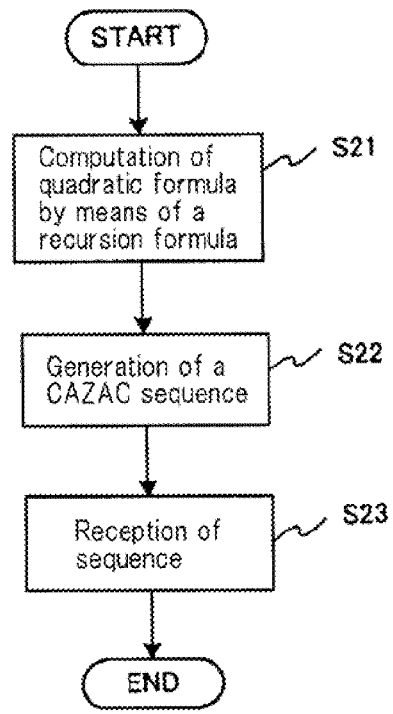
FIG. 3B is a flow chart showing the reception processing method that is carried out in the receiver shown in FIG. 2B.
Figure 4A:
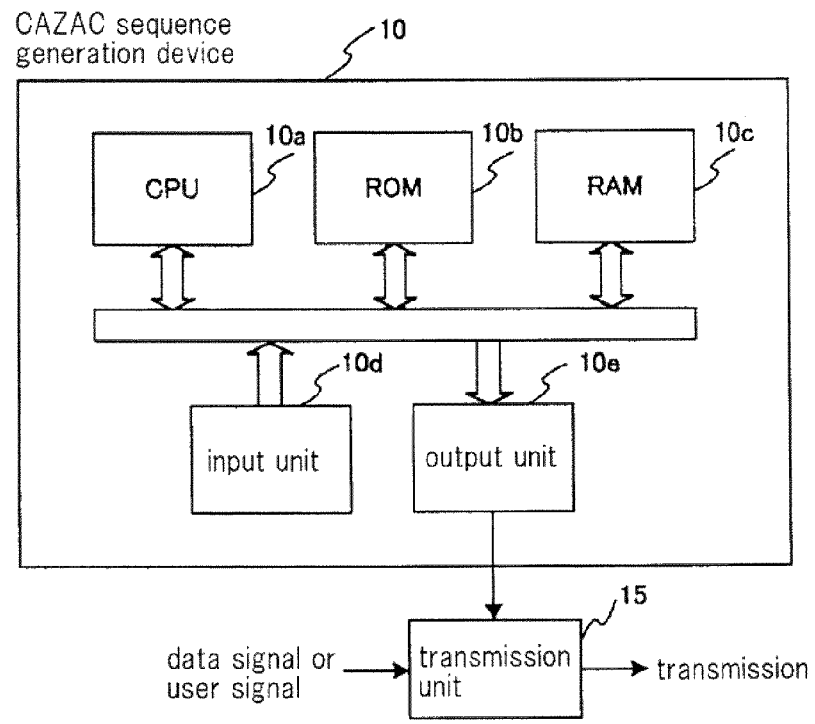
FIG. 4A is a block diagram showing the configuration of the device that executes, by means of a program, the transmission process of the wireless access system of the first embodiment of the present invention.
Figure 4B:
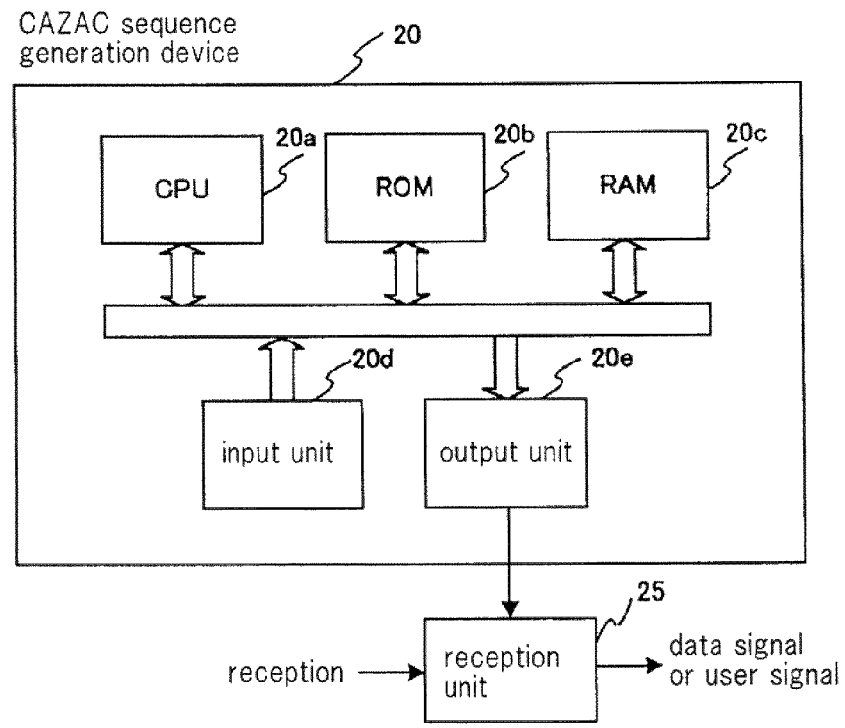
FIG. 4B is a block diagram showing the configuration of the device that executes, by means of a program, the reception process of the wireless access system of the first embodiment of the present invention.

FIG. 2A shows the configuration of the transmitter of the wireless access system of the first embodiment of the present invention, and FIG. 3A shows the transmission processing method (procedure). FIG. 2B shows the configuration of the receiver of the wireless access system of the first embodiment of the present invention, and FIG. 3B shows the reception processing method (procedure). In addition, FIGS. 4A and 4B show the configurations of devices for realizing, by means of a computer program, the processes of transmission and reception in the wireless access system of the first embodiment of the present invention.

As shown in FIG. 2A, the transmitter of the wireless access system is made up from: arithmetic unit 11 for receiving as input a sequence-defining expression that includes a quadratic formula in an exponent and for converting this arithmetic process of a quadratic formula to an arithmetic process of a recursion formula that is obtained according to the periodicity of the sequence-defining expression to generate the exponent; sequence generation unit 12 for generating the CAZAC sequence of the sequence-defining expression from the generated exponent; and transmission unit 13 for transmitting the generated CAZAC sequence as the reference signal of a data signal or the random access preamble signal.

As shown in FIG. 2B, the receiver of the wireless access system is made up from: arithmetic unit 21 for receiving as input a sequence-defining expression that includes a quadratic formula in an exponent and for converting this arithmetic process of a quadratic formula to an arithmetic process of a recursion formula obtained according to the periodicity of the sequence-defining expression to generate the exponent; sequence generation unit 22 for generating the CAZAC sequence of the sequence-defining expression from the generated exponent; and reception unit 23 for receiving a reference signal or a random access preamble signal and carrying out detection of a data signal or a user signal by means of the generated CAZAC sequence.

As shown in FIG. 3A, the transmission processing procedure of the wireless access system of the present embodiment is made up from: a step (S11) of converting the arithmetic process of a quadratic formula of the sequence-defining expression that includes a quadratic formula in the exponent to an arithmetic process of a recursion formula to generate the exponent; a step (S12) of generating a CAZAC sequence of the sequence-defining expression from the generated exponent; and a step (S13) of transmitting the generated CAZAC sequence as the reference signal of a data signal or the random access preamble signal.

As shown in FIG. 3B, the reception processing procedure of the wireless access system of the present embodiment is made up from: a step (S21) of converting an arithmetic process of a quadratic formula of a sequence-defining expression that contains a quadratic formula in an exponent to an arithmetic process of a recursion formula to generate the exponent; a step (S22) of generating a CAZAC sequence of the sequence-defining expression from the generated exponent; and a step (S23) of receiving the reference signal or the random access preamble signal and of receiving a data signal or detecting a user signal by means of the generated CAZAC sequence.

Still further, as shown in FIG. 4A, the transmitter of the wireless access system can be realized by CAZAC sequence generation device 10 and transmission unit 15. CAZAC sequence generation device 10 includes CPU (Central Processing Unit) 10a, ROM (Read Only Memory) 10b, RAM (Random Access Memory) 10c, input unit 10d, and output unit 10e; these components being bus-connected. A sequence-defining expression that includes a quadratic formula in an exponent is received as input from input unit 10d. CPU 10a uses RAM 10c as a work memory to convert the arithmetic process of a quadratic formula to an arithmetic process of a recursion formula and generate the above-described exponent and generates the CAZAC sequence of the sequence-defining expression. CPU 10a causes the output of the CAZAC sequence that was generated to transmission unit 15 from output unit 10e. Transmission unit 15 transmits the CAZAC sequence that was supplied from output unit 10e as the reference signal of a data signal or the random access preamble signal from transmission unit 15.

In order to realize the above-described transmitter functions, a control program (program) is stored in ROM 10b to convert a quadratic formula of an exponent of the above-described sequence-defining expression to a recursion formula and carry out operations, generate the above-described exponent, and, based on the generated exponent, generate a CAZAC sequence. CPU 10*a* that makes up the computer reads the program from ROM 10*b* and is controlled by the program that was read. CPU 10*a* executes the program to control each of the components, whereby the above-described functions are realized.

As shown in FIG. 4B, the receiver of the wireless access system can be realized by CAZAC sequence generation device 20 and reception unit 25. CAZAC sequence generation device 20 includes CPU (Central Processing Unit) 20*a*, ROM (Read Only Memory) 20*b*, RAM (Random Access Memory) 20*c*, input unit 20*d*, and output unit 20*e*; these components being bus-connected. A sequence-defining expression that includes a quadratic formula in an exponent is received as input in input unit 20*d*. CPU 20*a* uses RAM 20*c* as a work memory to convert an arithmetic process of a quadratic formula to an arithmetic process of a recursion formula to generate an exponent, and generates the CAZAC sequence of the sequence-defining expression. CPU 20*a* causes the output of the CAZAC sequence that was generated to reception unit 25 from output unit 20*e*. Reception unit 21 receives the reference signal or random access preamble signal and receives a data signal or detects a user signal by means of the CAZAC sequence that was supplied from output unit 20*e*.

To realize the functions of the above-described receiver, a control program (program) is stored in ROM 20*b* for converting the quadratic formula of the exponent of the above-described sequence-defining expression to a recursion formula, generating the above-described exponent, and generating a CAZAC sequence based on the generated exponent. CPU 20*a* that makes up the computer reads the program from ROM 20*b* and is controlled by the program that was read. CPU 20*a* executes the program to control each of the components, whereby the above-described functions are realized.

Second Embodiment

The transmitter and receiver of the wireless access system of the second embodiment of the present invention are next described.

Figure 5A:
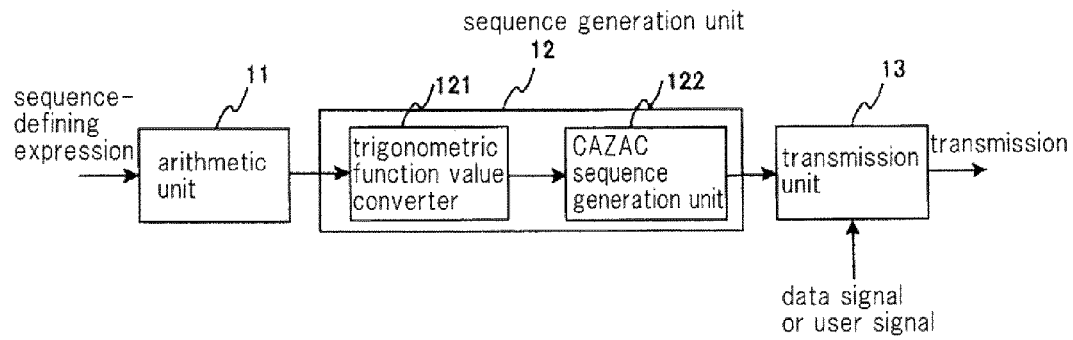
FIG. 5A is a block diagram showing the configuration of the transmitter of the wireless access system of the second embodiment of the present invention.
Figure 5B:
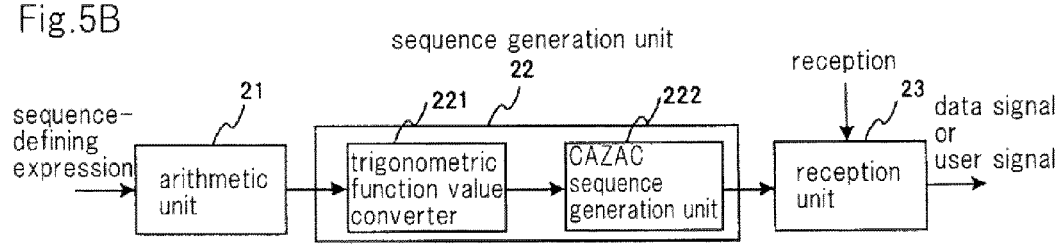
FIG. 5B is a block diagram showing the configuration of the receiver of the wireless access system of the second embodiment of the present invention.

FIGS. 5A and 5B show the configuration of the transmitter and receiver, respectively, of the wireless access system of the second embodiment.

As shown in FIG. 5A, the transmitter of the wireless access system of the present embodiment is made up from: arithmetic unit 11 that receives a sequence-defining expression that includes a quadratic formula in the exponent, converts the arithmetic process of the quadratic formula to an arithmetic process of a recursion formula obtained according to the periodicity of the sequence-defining expression to generate the exponent; sequence generation unit 12 that generates the CAZAC sequence of the sequence-defining expression from generated exponent; and transmission unit 13 that transmits the generated CAZAC sequence as the reference signal of a data signal or as the random access preamble signal.

Sequence generation unit 12 is provided with trigonometric function value converter 121 and CAZAC sequence generation unit 122. Trigonometric function value converter 121 converts the exponent that is received as input from arithmetic unit 11 to a trigonometric function value. CAZAC sequence generation unit 122 uses the trigonometric function value that was received as input from trigonometric function value converter 121 to generate a CAZAC sequence.

Trigonometric function value converter 121 can be configured as a reference unit that holds a reference table that allows corresponding trigonometric function values to be referenced with the exponents from arithmetic unit 11 as indices or addresses.

As shown in FIG. 5B, the receiver of the wireless access system of the present embodiment is made up from: arithmetic unit 21 that takes as input a sequence-defining expression that includes a quadratic formula in the exponent and that converts the arithmetic process of a quadratic formula to an arithmetic process of a recursion formula that is obtained according to the periodicity of the sequence-defining expression to generate the exponent; a sequence generation unit 22 that generates a CAZAC sequence of the sequence-defining expression from the generated exponent; and reception unit 23 that receives a data signal or detects a user signal by means of the generated CAZAC sequence.

Sequence generation unit 22 is further provided with trigonometric function value converter 221 and CAZAC sequence generation unit 222. Trigonometric function value converter 221 converts exponents that are received as input from arithmetic unit 21 to trigonometric function values. CAZAC sequence generation unit 222 uses the trigonometric function values that are received as input from trigonometric function value converter 221 to generate a CAZAC sequence.

The following explanation regards the functions relating to the generation of a CAZAC sequence and a detailed configuration of the arithmetic unit for these functions in the transmitter and receiver of the second embodiment. Because the operations of generating a CAZAC sequence are similar in the transmitter and receiver, only explanation relating to the transmitter is presented hereinbelow.

Arithmetic unit 11 of the transmitter is assumed to carry out operations by means of the following Formula 1 as a sequence-defining expression that includes a quadratic formula in the exponent. Formula 1 is a sequence-defining expression (complex number) that includes a quadratic formula n (n+1) relating to n in the exponent at the upper right of the exponential.

$$X_u(n) = e^{-j\frac{\pi u n(n+1)}{N_{zc}}}, (2\pi/m) \qquad \text{Formula 1}$$

$$n = 0, 1, \ldots, N_{zc} - 1$$

The sequence-defining expression and sequence length Nzc and sequence number u of the CAZAC sequence that is generated are applied as input to arithmetic unit 11. Arithmetic unit 11 carries out an operation by initializing the recursion formula and updating the recursion formula for the sequence-defining expression and, as the operation result, generates variable P(n) as an exponent. Variable P(n) is supplied to trigonometric function value converter 121 from arithmetic unit 11.

The relation between the sequence-defining expression and the recursion formula of the present embodiment is next described.

The sequence-defining expression of Formula 1 is transformed using the maximum value m of variable P(n) that corresponds to a one-period ($2\pi$ space) portion of trigonometric function values.

$$\begin{aligned}
\exp(-j\pi un(n+1)/Nzc) &= \exp(-j(2\pi/m) \cdot (2mu/Nzc)n(n+1)) \\
&:= \exp(-j(2\pi/m) \cdot [(2mu/Nzc)n(n+1)]) \\
&= \exp(-j(2\pi/m) \cdot \\
&\quad ([(2mu/Nzc)n(n+1)] \bmod m)) \\
&= \exp(-j(2\pi/m) \cdot P(n))
\end{aligned}$$

where [ ] in exp(-j(2π/m)·([(2mu/Nzc)n(n+1)] mod m)) means integer output (cut-out). In the operations inside [ ], because integer multiples of m can be ignored, modulo (mod) m at this time point is taken according to the periodicity relating to φ of function exp(-j2π·φ)) (where φ is any real number).

Here, P(n) is defined by the next formula.

$$P(n) = [P\hat{\,}(n)] \bmod m$$

$$P\hat{\,}(n) = ((m/2)u/Nzc)n(n+1)$$

Further, R(n) is defined by the following formula.

$$\begin{aligned} R(n) &= P\hat{\,}(n+1) - P\hat{\,}(n) \\ &= ((m/2)u/Nzc)(n+1)(n+2) - ((m/2)u/Nzc)n(n+1) \\ &= (mu/Nzc)(n+1) \end{aligned}$$

However, R(0)=mu/Nzc, and K0 is the initial value of R(n).
Accordingly, the following formula is realized as the recursion formula of R(n).

$$\begin{aligned} R(n+1) - R(n) &= (mu/Nzc)(n+1) - (mu/Nzc)n \\ &= mu/Nzc \end{aligned}$$

The following formula is realized as the recursion formula of P(n):

$$P\hat{\,}(n+1) - P\hat{\,}(n) = (mu/Nzc)(n+1)$$

Considering the implementation of updating of R(n) by using the recursion formula R(n+1)=R(n)+mu/Nzc that is derived from the above formula, the value mu/Nzc that is added to the preceding R(n) is update value K1 (=K0). When K0 and K1 are equal to or greater than m, mod m is taken.

Accordingly, initial value K0 used for CAZAC sequence generation of this example is given by the following Formula 2:

$$K_0 = \frac{m \cdot u}{N_{ZC}} \bmod m \qquad \text{Formula 2}$$

The initialization (initial values) of P(n), P^(n), and R(n) are given by the following Formula 3:

$$\begin{aligned} &P(n) \text{ initialization:} \quad P\hat{\,}(0) \leftarrow 0, P(0) \leftarrow 0 \\ &R(n) \text{ initialization:} \quad R(0) \leftarrow K0\left(= \frac{m \cdot u}{N_{ZC}} \bmod m\right) \end{aligned} \qquad \text{Formula 3}$$

Based on Formula 1, the recursion formulas (operational expressions) of P(n) and R(n) are as shown in the following Formula 4:

Formula 4
```
Loop n = 1,2...(N_ZC - 1)
    P^(n) ← P^(n - 1) + R(n - 1)
    if P^(n) ≥ m,then P^(n) ← P^(n) - m
    P(n) ← ⌊P^(n)⌋
    R(n) ← R(n - 1) + K₁
    if R(n) ≥ m, then R(n) ← R(n) - m
    n ← n + 1
end Loop
    ⌊ ⌋ is integer - bit cut - out,
    K₁ is an update value (K₀)
```

Here, P^(n) is of the form P^(n)=((m/2)u/Nzc)n(n+1).

Figure 6A:
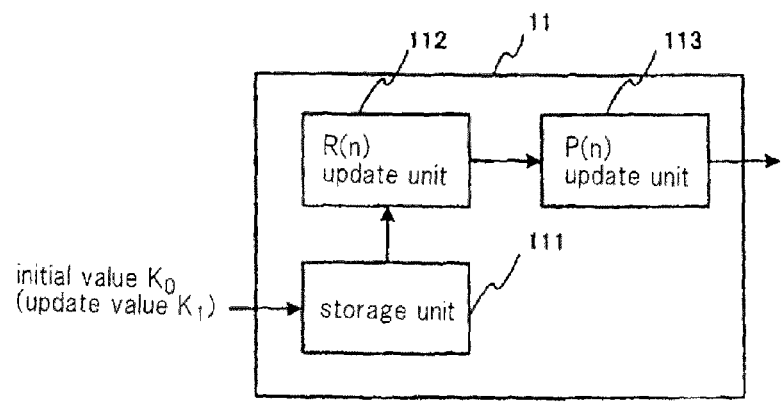
FIG. 6A is a block diagram showing the configuration of the arithmetic unit of the transmitter of the second embodiment of the present invention.
Figure 6B:
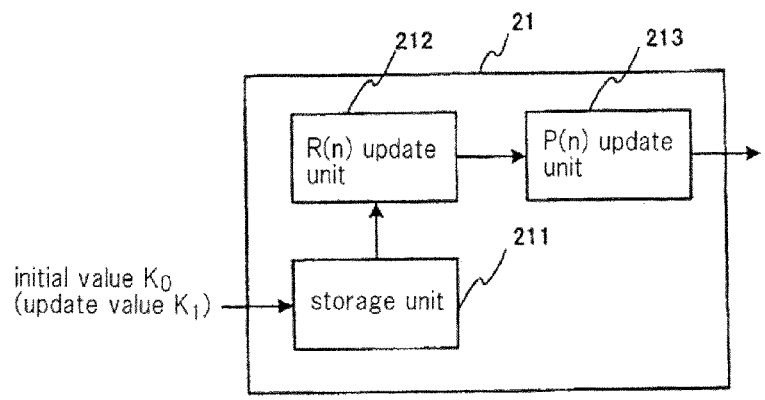
FIG. 6B is a block diagram showing the configuration of the arithmetic unit of the receiver of the second embodiment of the present invention.

FIGS. 6A and 6B show the configurations of the arithmetic units of the transmitter and the receiver, respectively, of the second embodiment. As shown in FIG. 6A, arithmetic unit 11 of the transmitter is made up from: storage unit 111 of initial value K0 and update value K1; R(n) update unit 112; and P(n) update unit 113. As shown in FIG. 6B, arithmetic unit 21 of the receiver is made up from: storage unit 211 of initial value K0 and update value K1; R(n) update unit 212, and P(n) update unit 213. The functions of the arithmetic units in the transmitter and receiver are identical, and explanation will therefore here relate to the functions of each component of the arithmetic unit of the transmitter.

Storage unit 111 holds initial value K0 and update value K1 that are received as input and supplies initial value K0 and update value K1 that are held according to the initialization and updating operations of R(n) update unit 112.

R(n) update unit 112 uses recursion formula R(n+1)=R(n)+mu/Nzc that is derived from the above expression to carry out updating of R(n). In other words, R(n) update unit 112 takes the value mu/Nzc that is to be added to the one preceding R(n) as K1 (K0) (a value that takes mod m when equal to or greater than m), carries out updating of R(n) R(n−1)+K1 of Formula 4, and takes mod m of R(n).

P(n) update unit 113 uses recursion formula P^(n+1)=P^(n)+(mu/Nzc) (n+1)=P^(n)+R(n) that is derived from the above expression to carry out updating of P(n) (however, R(0)=K(0)). P(n) update unit 113 supplies as output the integer (bits) of P^(n) that was obtained, and supplies this integer value as P(n). In other words, P(n) update unit 113 carries out updating of P^(n)←P^(n−1)+R(n−1) of formula 4, and takes mod m of the integer of P^(n) to supply as output.

In the transmitter shown in FIG. 5A, trigonometric function value converter 121 next carries out trigonometric function operations based on variables P(n) that were successively generated by the updating of the recursion formula in arithmetic unit 11 to supply trigonometric function values (cosine values and sine values). CAZAC sequence generation unit 122 carries out operations upon (cos P(n)−j sin P(n)) based on the trigonometric function values supplied by trigonometric function value converter 121 and supplies these as a CAZAC signed sequence.

Transmission unit 13 of the transmitter then transmits the generated CAZAC signed sequence as the reference signal of a data signal or as a random access preamble signal.

The configurations and operations of arithmetic unit 21 and sequence generation unit 22 of the receiver shown in FIG. 5B are identical to those of the above-described transmitter. However, reception unit 23 receives the reference signal and data signal or the random access preamble signal from the transmitter and uses the received reference signal or random access preamble signal and the CAZAC sequence that was generated in arithmetic unit 21 and sequence generation unit 22 to detect the data signal or a random access user.

In the preceding explanation, Formula 1 was set as a sequence-defining expression, but the following Formula 5 can typically be taken as the sequence-defining expression. In this case, $P^{\wedge}(n)$ takes the form of $P^{\wedge}(n)=((m/2)u/Nzc)f(n)$.

$$X_u(n) = e^{-j\frac{\pi u f(n)}{N_{zc}}},$$
$$n = 0, 1, \ldots, N_{zc}-1$$

Formula 5 f(n); Quadratic equation regarding n

In addition, update value K1 is a value based on quadratic formula f(n) and is a constant value.

Accordingly, the recursion formula of R(n) in the case of Formula 5 is the following Formula 6.

$$R(n) \leftarrow R(n-1)+K_1$$

Formula 6

K1; Update value (Fixed value)

An explanation of the procedures for generating CAZAC sequences by means of the embodiments shown in FIGS. 5A, 5B, 6A, and 6B that use the example of a transmitter is as follows.

First, the sequence length Nzc and CAZAC sequence number u (=any of 1, 2, . . . , Nzc) of the CAZAC sequence that is to be generated as the reference signal of a data signal or the random access preamble signal are selected and applied as input to arithmetic unit 11. The initial value K0 (update value K1) for the generation of a CAZAC sequence that corresponds to sequence length Nzc and sequence number u that were applied as input are stored in storage unit 111 of arithmetic unit 11.

Next, Formula 2 and Formula 3 are used to initialize R(n) in R(n) update unit 112. In addition, P(n) and $P^{\wedge}(n)$ (n=0, 1, . . . , Nzc−1) are initialized to "0" in P(n) update unit 113. After initialization, R(n), P(n), and $P^{\wedge}(n)$ are updated by means of the previously described functions using Formula 4 for n (=1, 2, . . . , Nzc−1) in R(n) update unit 112 and in P(n) update unit 113.

Still further, in trigonometric function value converter 121, using integer values P(n) (n=0, 1, . . . , Nzc−1) that have been initialized and updated, real part R[xu(n)] (n=0, 1, . . . , Nzc−1) and imaginary part I[xu(n)] (n=0, 1, . . . , Nzc−1) of CAZAC sequence xu(n) (n=0, 1, . . . , Nzc−1) are generated. Finally, a CAZAC sequence is supplied in the form of R[xu(n)]+i*I[xu(n)] (n=0, 1, . . . , Nzc−1) (where i(i2=−1) is an imaginary unit) in CAZAC sequence generation unit 113.

The generation procedure of the CAZAC sequence is identical in the receiver. The selected sequence length Nzc and sequence number u are identical to those of the transmitter that is the reception object.

As described hereinabove, in the present embodiment, the quadratic formula included in the exponent of the sequence-defining expression is converted to a recursion formula and operations are carried out, variable P(n) is generated that corresponds to phase information of the trigonometric function of the real part and imaginary part of the sequence-defining expression (complex number), and cos P(n)−j sin P(n) is computed from the sine value and cosine value of P(n) to be supplied as a CAZAC sequence. Converting the quadratic formula contained in the exponent of the sequence-defining expression to a recursion formula to realize computation enables the complete elimination of the operation processes of multiplication and division that were required in the generation of a sequence according to the defining expression and allows a CAZAC sequence to be generated by only addition and subtraction. As a result, the required computation amount and circuit scale can be drastically reduced.

Third Embodiment

The transmitter and receiver of the wireless access system of the third embodiment of the present invention are next described. The generation unit of a CAZAC sequence of this embodiment is an example of a configuration of a preamble sequence generation unit or a reference sequence generation unit that is suitable for a 3GPP LTE uplink transmitter and receiver. A detailed example of the configuration of the transmission unit of the transmitter and reception unit of the receiver will later be described as the eighth embodiment.

The present embodiment is in a form that enables the reduction of the amount of computation required for CAZAC sequence generation in, for example, terminals and base stations. The basic concept is to convert the quadratic formula relating to n at the upper right of an exponential to a process of addition and subtraction by a recursion formula, and to hold a table of cosine (cos) values and refer to this table and compute cos and sin values to generate a CAZAC sequence. According to the present embodiment, a trigonometric function value converter is configured to have a reference table of, for example, cosine (cos) values as a reference unit and to generate sequences by referring to the table. The need for exponential operations (the operations of trigonometric functions sin and cos) circuit is thus eliminated, and this feature is extremely advantageous from the viewpoint of circuit scale when realizing a circuit by, for example, FPGA.

Figure 7A:
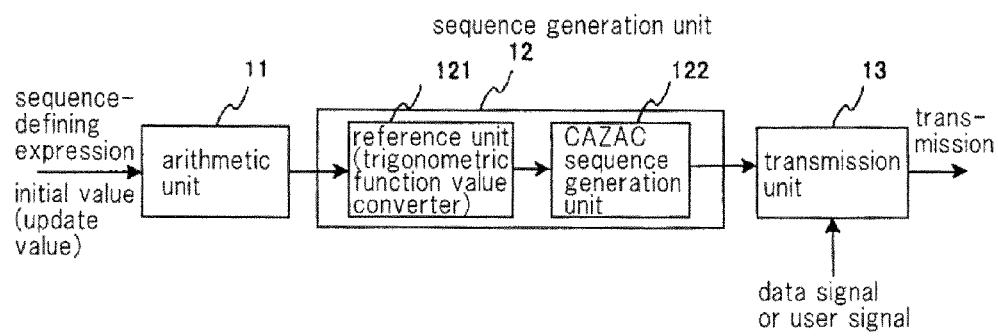
FIG. 7A is a block diagram showing the configuration of the transmitter of the wireless access system of the third embodiment of the present invention.
Figure 7B:
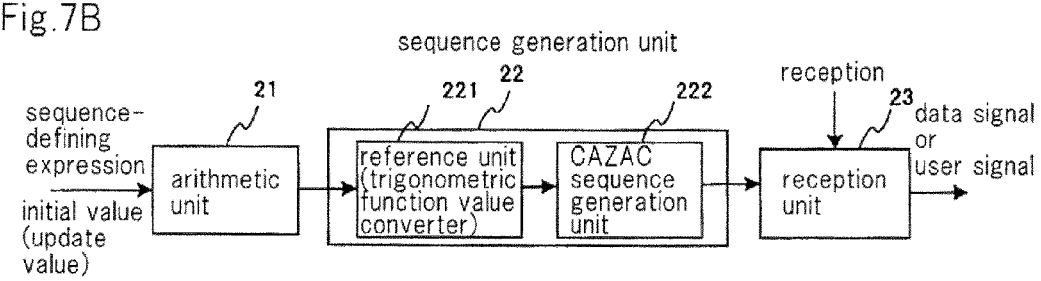
FIG. 7B is a block diagram showing the configuration of the receiver of the wireless access system of the third embodiment of the present invention.

FIGS. 7A and 7B show configurations of a transmitter and receiver, respectively, of the wireless access system of the third embodiment.

As shown in FIG. 7A, the transmitter is made up from: arithmetic unit 11 that receives as input the initial values (update values) of a recursion formula based on the above-described Formula 1 as a sequence-defining expression, sequence length Nzc, and sequence number u and that computes a quadratic formula by means of the recursion formula to generate variable P(n); as sequence generation unit 12, reference unit (cosine table reference unit) 121 that supplies cosine values from the generated variable P(n) and CAZAC sequence output unit 122 that generates (cos P(n)−j sin P(n)) from sine values and cosine values and takes the result as a signed sequence; and transmission unit 13.

As shown in FIG. 7B, the receiver is made up from: arithmetic unit 21 that receives, as a sequence-defining expression, initial values (update values) of a recursion formula that is based on Formula 1, sequence length Nzc, and sequence number u that are the same as on the transmitter side and that computes a quadratic formula by means of the recursion formula to generate variable P(n); as sequence generation unit 22, cosine table reference unit 221 that supplies cosine values from the generated variable P(n); and CAZAC sequence output unit 222 that generates (cos P(n)−j sin P(n)) from sine values and cosine values and takes the result as a signed sequence; and reception unit 13.

Figure 7C:
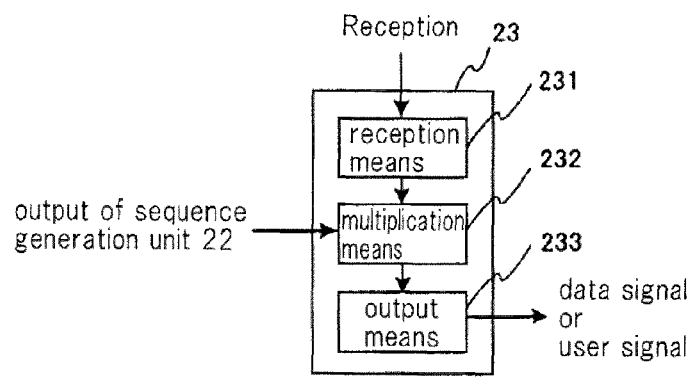
FIG. 7C is a block diagram showing the configuration of the reception unit of the receiver shown in FIG. 7B.

More specifically, as shown in FIG. 7C, reception unit 23 is made up from: reception means 231 that receives a data signal and reference signal of a transmission signal or a random access preamble signal supplied by a transmitter; multiplication means 232 that multiplies the reference signal or the random access preamble signal with a CAZAC sequence that is generated by sequence generation unit 22; and output means 233 that, based on the output of multiplication means 232, equalizes and demodulates each of the received data signals or that detects a random access user.

In the present embodiment, reference tables (cosine reference tables) that allow reference of cosine values by means of reference indices (cosine reference index data) are provided as reference units 121 and 221.

The cosine reference table, instead of taking the cosine value of one period (a $2\pi$ interval) of the cosine as the number of elements that can be referenced corresponding to the maximum value m of variable P(n), takes the number of elements that can be referenced of the cosine reference table itself as a ¼-period ($\pi/2$ interval: $0-\pi/2$) portion to enable a reduction of the memory size of the reference table itself. If the values from at least either a plus or minus peak value down to "0" ($\pi/2$ interval) can be referenced, all of the trigonometric function values of a $2\pi$ interval can be generated. For this purpose, the reference unit refers to the elements of a cosine reference table of a $7E/2$ interval for variables P(n) of a $2\pi$ interval, implements control such as adding signs, and generates all trigonometric function values of a $2\pi$ interval.

The generation of a CAZAC sequence of the present embodiment is next described. In relation to the generation of CAZAC sequences, because the configuration and operations in the transmitter and receiver are identical, explanation here regards only the case of a transmitter.

Figure 8:
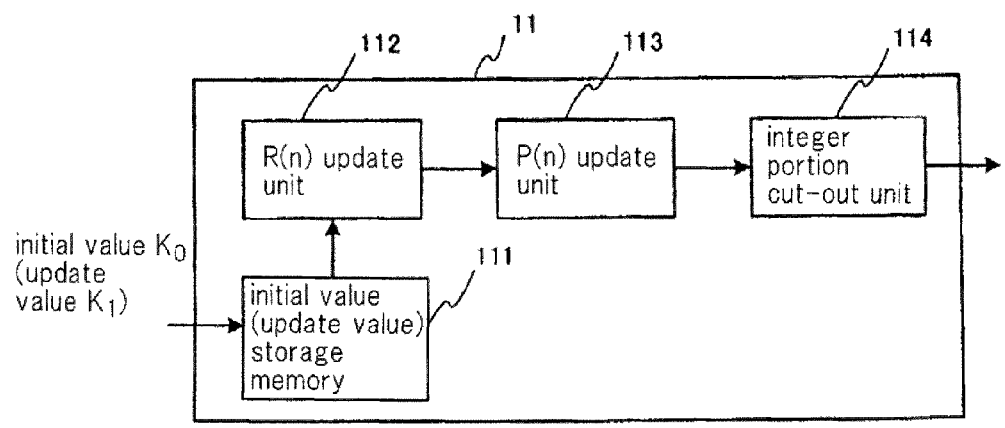
FIG. 8 is a block diagram showing the configuration of the arithmetic unit of the transmitter of the third embodiment of the present invention.

FIG. 8 shows the configuration of the arithmetic unit of the transmitter of the third embodiment. As shown in FIG. 8, arithmetic unit 11 of the transmitter is made up from initial value (update value) storage memory (initial value storage memory) 111, R(n) update unit 112, P(n) update unit 113, and integer portion cut-out unit 114.

The numerical values handled in the present embodiment are assumed to be 31 11Q20-format unsigned bits (the 11 higher-ranking bits being integer values, and the 20 lower-ranking bits being decimal values). Integer portion cut-out unit 114 cuts out and supplies the integer portion of P^ from the output of P(n) update unit 113. In addition, reference index data are unsigned 9-bit data, and the trigonometric function values of cosine reference table are unsigned 16-bit data.

Initial value K0 (31 unsigned bits in 11Q20 format) for CAZAC sequence generation that corresponds to the sequence number u ($=1, 2, \ldots$, Nzc−1) of sequence length Nzc (for example, prime-number lengths such as Nzc=11, 23, 31, 47, 59 are assumed in 3GPP LTE) that are used in, for example, a transceiver system are stored in initial value storage memory 111. Here, the initial value K0 is given by the following Formula 7.

$$K_0 = \frac{2048 \cdot u}{N_{ZC}} \bmod 2048 \qquad \text{Formula 7}$$

In other words, when the integer portion of K0 is equal to or greater than 2048, the integer portion is assumed to be a value that takes mod 2048.

In addition, the initial values and recursion formula (operational expression) are given by the following Formulas 8 and 9, respectively.

$$P(n) \text{ update portion initialization: } P^\wedge(0) \leftarrow 0, P(0) \leftarrow 0 \qquad \text{Formula 8}$$

$R(n)$ update portion initialization: $R(0) \leftarrow$ $$K0\left(=\frac{2048 \cdot u}{N_{ZC}} \bmod 2048\right)$$

Formula 9

Figure 9:
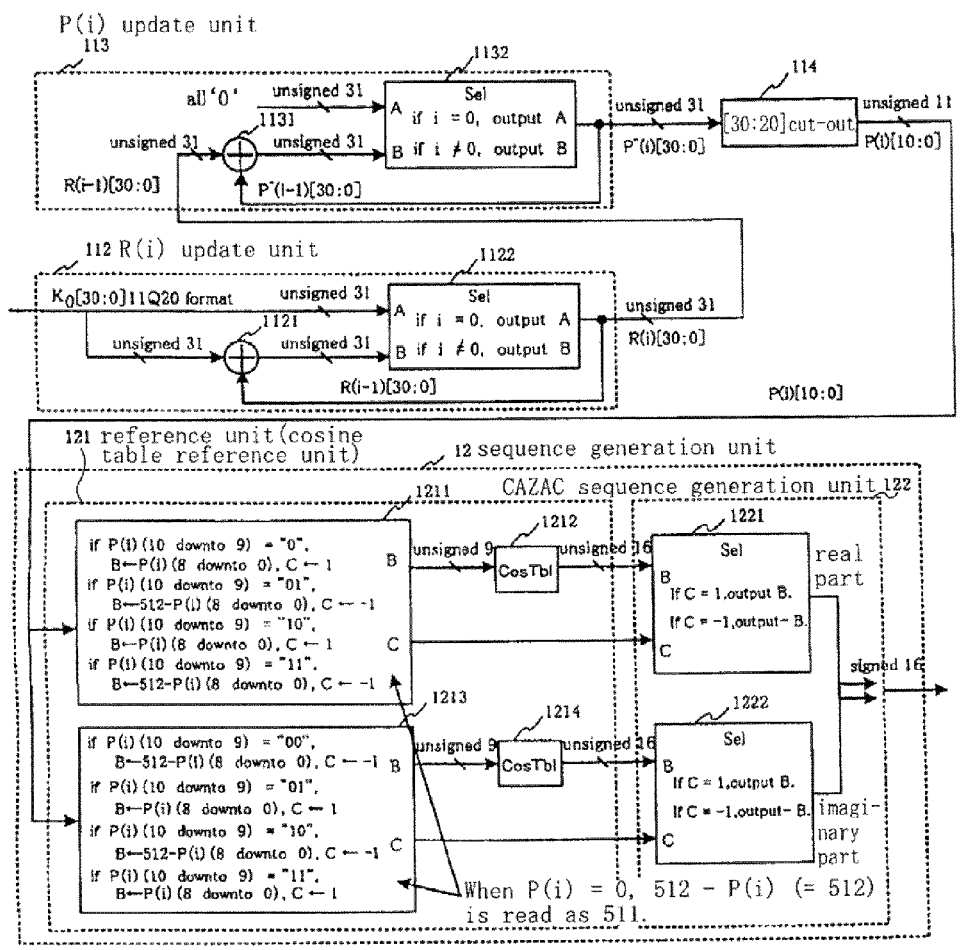
FIG. 9 is a block diagram for explaining the configuration and operations of the actual CAZAC sequence generation circuits of the arithmetic unit and sequence generation unit of the third embodiment of the present invention.

Loop n = 1,2...($N_{ZC}$ − 1)
    $P^\wedge(n) \leftarrow P^\wedge(n - 1) + R(n - 1)$
    if $P^\wedge(n) \geq 2048$, then $P^\wedge(n) \leftarrow P^\wedge(n) - 2048$
    $P(n) \leftarrow \lfloor P^\wedge(n) \rfloor$
    $R(n) \leftarrow R(n - 1) + K_1$
    if $R(n) \geq 2048$, then $R(n) \leftarrow R(n) - 2048$
    $n \leftarrow n + 1$
end Loop
    $\lfloor \; \rfloor$ indicates integer bit cut - out,
    $K_1 = K_0$ FIG. 9 shows the configuration and processing method of the actual CAZAC sequence generation circuits of the arithmetic unit and sequence generation unit of the third embodiment. These CAZAC sequence generation circuits are provided in each transmitter and receiver. The configuration and operations of the CAZAC sequence generation circuits are next described taking the transmitter as an example.

Arithmetic unit 11 is provided with R(i) update unit 112, P(i) update unit 113, and [30:20] cut-out unit 114. Sequence generation unit 12 is provided with cosine table reference unit 121 and CAZAC sequence generation unit 122.

R(i) update unit 112 is provided with adder 1121 and selector Sel 1122. Adder 1121 supplies the addition value of R(i−1) and initial value K0 for CAZAC sequence generation relating to output R(i) of selector Sel 1122 to input terminal B of selector Sel 1121. Selector Sel 1122 makes initial value K0 of input terminal A the output R(i) when i=0 and makes the input value of input terminal B the output R(i) when i does not equal 0.

P(i) update unit 113 is provided with adder 1131 and selector Sel 1132. Adder 1131 supplies the addition value of P^(i−1) and R(i−1) relating to output P^(i) of selector Sel 1132 and output R(i) of R(i) update unit 112 to input terminal B of selector Sel 1132. Selector Sel 1132 takes the "all '0'" of input terminal A as output P^(i) when i=0, and takes the input value of input terminal B as output P^(i) when i does not equal 0.

Cosine table reference unit 121 is provided with: first arithmetic unit 1211 for generating the real part of a complex number based on output P(i) [10:0](11 unsigned bits) and cosine table Cos Tbl 1212 that is referenced by the arithmetic output; and second arithmetic unit 1213 for generating the imaginary part of the complex number and cosine table Cos Tbl 1214 that is referenced by the arithmetic output. Sequence generation unit 122 is provided with: selector Sel 1221 and selector Sel 1222 for adding signs to the cosine values read from cosine table Cos Tbl 1212 and cosine table Cos Tbl 1214, respectively, and for combining the real part and imaginary part of the complex number.

[30:20] cut-out unit 114 implements a cut-out process of up to 20 bits from the 30 higher ranking bits. In other words, [30:20] cut-out unit 114 cuts out up to 20 bits from the 30 higher-ranking bits of the 31 unsigned bits of P^(i) and supplies 11 unsigned bits of integer values P(i) [10:0].

The operations of cosine table reference unit 121 and CAZAC sequence generation unit 122 are next described.

First arithmetic unit 1211, based on the values of the two highest-ranking bits of P(i) [10:0], computes the data and cosine signs (C) of table reference indices (or reference addresses) of 9 unsigned bits of the cosine table and supplies this data and the cosine signs. Using the 9 unsigned bits from first arithmetic unit 1211 as table reference indices (addresses), Cos Tbl 1212 supplies the corresponding 16 unsigned bits of cosine values. Selector Sel 1221 appends the cosine signs (C) from first arithmetic unit 1211 to the 16 unsigned bits of cosine values that are received as input from Cos Tbl 1212 and supplies the result as the real part of a complex number.

Second arithmetic unit 1213, based on the two highest-ranking bits of P(i) [10:0], computes the data and cosine signs of table reference indices (addresses) of 9 unsigned bits of the cosine table and supplies this data and the cosine signs as output. Cos Tbl 1214, using the nine unsigned bits from second arithmetic unit 1213 as table reference indices (addresses), supplies the 16 unsigned bits of cosine values that correspond to the indices. Selector Sel 1222 appends cosine signs (C) from second arithmetic unit 1213 to the 16 unsigned bits of cosine values that are received as input from Cos Tbl 1214 and supplies the result as the imaginary part of the complex number.

Here, cosine tables Cos Tbl 1212 and 1214 are referenced such that: the number of table elements of ¼ of one cosine period ($2\pi$) is taken as 512; $\cos\{((\pi/2)/512)\cdot i\}$ where $i(=0, 1, \ldots, 511)$ is stored in the $i(=0, 1, \ldots, 511)^{th}$ element; and cosine values (2048) of a one-period portion of cosines are supplied by means of these table elements (cosine values 512).

In the present embodiment, it is assumed that the number of table elements of the cosine table is 512 and that $\cos[\{(\pi/2)/512\}\cdot i]$ where $i(=0, 1, \ldots, 511)$ is stored in the $i(=0, 1, \ldots, 511)^{th}$ element, but a different number of elements of the cosine table can be used. In addition, although cosine (cos) values are stored as a cosine table, the same processing as when using a cosine table can be realized if sine (sin) values of the same range are stored as a sine table.

Explanation next regards the procedure for the generation of a CAZAC sequence (reference sequence or preamble sequence) of the CAZAC sequence generation circuit of the present embodiment.

First, the CAZAC sequence length Nzc and the CAZAC sequence number u (=any of $1, 2, \ldots, $ Nzc) of the CAZAC sequence that is to be generated are applied as input to initial value storage memory 111. In addition, initial value K0 and update value K1 for CAZAC sequence generation corresponding to the designated sequence length Nzc and sequence number u are delivered to R(n) update unit 112.

Next, using the above-described Formula 8, R(n) is initialized in R(n) update unit 112 or P(n) and P^(n) are each initialized in P(n) update unit 113.

In the present embodiment, in the recursion formula process that is given by Formula 8, variables R(n) and P^(n) (n=0, 1, ..., Nzc−1) and K0 are all assumed to be 31 unsigned bits (11Q20 format) and P(n) (n=0, 1, ..., Nzc−1) are assumed to be 11 unsigned bits (11Q0 format). However, this format can be freely set by the designer according to the accuracy of the CAZAC sequence this is demanded or the limits of the memory size of the cosine table.

After initialization, R(n), P(n), and P^(n) are updated by means of the previously described Formula 9 in R(n) update unit 112 and P(n) update unit 113 for n (=1, 2, ..., Nzc−1).

In the recursion formula process that is given by Formula 9, a comparison/subtraction process [if P^(n)≧2048, then P^(n)←P^(n)−2048] in the updating of P(n) and a comparison/subtraction process [if R(n)≧2048, then R(n)←R(n)−2048] in the updating of R(n) are necessary when the arithmetic unit is realized by software such as a DSP (Digital Signal Processor), but when the arithmetic unit is realized by, for example, FPGA, the arithmetic unit can be configured to ignore overflow, whereby the arithmetic unit can be realized by the next Formula 10 that enables processing by only addition and bit cut-out.

$$P\hat{}(n) \leftarrow P\hat{}(n-1) + R(n-1)$$

$$P(n) \leftarrow \lfloor P\hat{}(n) \rfloor$$

$$R(n) \leftarrow R(n-1) + K, \quad \text{Formula 10}$$

In other words, the operation of generating a CAZAC sequence shown in FIG. 9 is assumed to be realized by a circuit such as FPGA that ignores overflow, and the processes of comparison and subtraction are unnecessary. Accordingly, a process of a recursion formula of the following Formula 11 can be adopted in place of the process according to Formula 9 in the configuration shown in FIG. 9.

Formula 11
$$\begin{aligned}
&\text{Loop } n = 1,2 \ldots (N_{ZC} - 1) \\
&\quad P\hat{}(n) \leftarrow P\hat{}(n-1) + R(n-1) \\
&\quad P(n) \leftarrow \lfloor P\hat{}(n) \rfloor \\
&\quad R(n) \leftarrow R(n-1) + K_1 \\
&\quad n \leftarrow n+1 \\
&\text{end Loop}
\end{aligned}$$

Cosine table reference unit 121 generates the real part R[xu(n)] (n=0, 1, ..., Nzc−1) and the imaginary part I[xu(n)] (n=0, 1, ..., Nzc−1) of a CAZAC sequence xu(n) (n=0, 1, ..., Nzc−1) by means of Formula 12 that is shown next with P(n) (n=0, 1, ..., Nzc−1) that is generated by the above-described process as the table reference indices.

Finally, CAZAC sequence generation unit 122 implements switch control of selectors Sel 1221 and 1222 by means of the 16 unsigned bits of cosine values that were found and signs and supplies CAZAC sequence in the form R[xu(n)]+i*I[xu(n)] (n=0, 1, ..., Nzc−1). Here, i(i2=−1) shows the imaginary unit.

When $0 \leq P(n) < 512$:

Formula 12

$P'(n) \leftarrow P(n)$ $R[Xu(n)] \leftarrow COS\_TBL[P'(n)]$ if $P'(n) \neq 0$, then $T[Xu(n)] \leftarrow COS\_TBL[512 - P'(n)]$ if $P'(n) = 0$, then $T[Xu(n)] \leftarrow COS\_TBL[511]$ When $512 \leq P(n) < 1024$:

$P'(n) \leftarrow P(n) - 512$ $T[Xu(n)] = -COS\_TBL[P'(n)]$ if $P'(n) \neq 0$, then $R[Xu(n)] \leftarrow -COS\_TBL[512 - P'(n)]$ if $P'(n) = 0$, then $R[Xu(n)] \leftarrow -COS\_TBL[511]$ When $1024 \leq P(n) < 1536$:

$P'(n) \leftarrow P(n) - 1024$ $R[Xu(n)] \leftarrow -COS\_TBL[P'(n)]$ if $P'(n) \neq 0$, then $T[Xu(n)] \leftarrow COS\_TBL[512 - P'(n)]$ if $P'(n) = 0$, then $T[Xu(n)] \leftarrow COS\_TBL[511]$ -continued When $1536 \leq P(n) < 2048$:

$P'(n) \leftarrow P(n) - 1536$ $T[Xu(n)] \leftarrow \text{COS\_TBL}[P'(n)]$ if $P'(n) \neq 0$, then $R[Xu(n)] \leftarrow \text{COS\_TBL}[512 - P'(n)]$ if $P'(n) = 0$, then $R[Xu(n)] \leftarrow \text{COS\_TBL}[511]$ where $\text{COS\_TBL}[P'(n)] = \cos\left(\frac{\pi/2}{512} \cdot n\right)$ for $n = 0, 1, \ldots, 511$ Although the configuration and operations relating to the transmitter have been described hereinabove, the receiver is of the same configuration as the transmitter.

In the present embodiment, as a sequence-defining expression, for a function (exponential) that represents a sign sequence that includes a quadratic function in the exponent, the quadratic formula that relates to n in the superscript of the exponential is converted to processes of addition and subtraction by means of a recursion formula, and a trigonometric function table that holds, for example, cosine (cos) values is referenced by the solutions realized by the recursion formula to compute cos and sin values and to generate a CAZAC sequence. The quadratic formula relating to n in the exponential of the CAZAC sequence-defining expression is converted to addition and subtraction processes as a recursion formula whereby the multiplication and division operations required for generating a CAZAC sequence in a terminal and base station can be completely eliminated and the amount of computation can be reduced.

In particular, in the present embodiment, computation of the exponential value is carried out by referring to a cosine table, whereby the need for computation of cos values and sin values that was originally necessary to compute exponential values can be eliminated to realize a further corresponding reduction of the computation amount.

In addition, when a reference table of, for example, cosine (cos) values is used in the computation of trigonometric function values, sequence generation can be easily obtained by referring to a table. As a result, the need for an exponential operation (the computation of trigonometric functions sin and cos) circuit is eliminated, a result that is extremely advantageous from the standpoint of circuit scale when realizing a circuit by, for example, FPGA.

Still further, modulo computation for $P\hat{\ }(n) \geq 2048(m)$ and $R(n) \geq 2048(m)$ can be realized by using, for example, FPGA that can ignore overflow, whereby the present embodiment can achieve a further major reduction of computation amount.

Fourth Embodiment

Although examples of configurations in which all CAZAC sequences were generated by the same method have been shown in the above-described embodiments, the amount of computation can be reduced by half by taking advantage of the characteristics of CAZAC sequences.

In other words, CAZAC sequences have sequence symmetry due to the relation between the first half and second half of a sequence. This symmetry of CAZAC sequences is as shown in Formula 13 below.

$Xu(N_{zc}-n-1)=Xu(n); n=0, 1, \ldots, N_{zc}-1$      Formula 13

By using this property, a CAZAC sequence of the designated sequence length can be generated by generating a sequence of approximately half, which is the first half, of the CAZAC sequence.

For example, if the sequence length Nzc of the sought CAZAC sequence is 11, application of Formula 13 yields Formula 14 shown below.

$Xu(10)=Xu(0)$ $Xu(9)=Xu(1)$ $Xu(8)=Xu(2)$ $Xu(7)=Xu(3)$ $Xu(6)=Xu(4)$      Formula 14

Accordingly, if the case of a CAZAC sequence having length Nzc=11 is described, after finding xu(0), xu(1), xu(2), xu(3), xu(4), and xu(5) by using the method described in the previously-described embodiments, the remaining xu(10), xu(9), xu(8), xu(7), and xu(6) can be found by using Formula 14.

By taking advantage of the property of Formula 13 as described hereinabove, the sequence xu(Nzc−t−1) (t<Nzc_1) can be generated by means of the sequence xu(t) that was generated by the process of the embodiment by substituting xu(Nzc−t−1)=xu(t) in that process. In this case, compared to a case of carrying out all processing by the method of the embodiment, a CAZAC sequence can be generated by approximately half of the processing.

Thus, according to the present embodiment, using the symmetry with respect to index n of a CAZAC sequence has the advantage of enabling a further reduction by half of the computation amount that was reduced by the method of the embodiment.

Fifth Embodiment

Although explanation has been presented on the assumption of the generation of CAZAC sequences of the time domain in the above-described embodiments, the sequence-defining expression shown in Formula 1 can be used for sequences of a time domain and for sequences of the frequency domain, and as a result, if these sequences are viewed as sequences of the frequency domain, a CAZAC sequence of the frequency domain can be generated. In other words, a CAZAC sequence in the frequency domain is similar to Formula 1 and is represented by a form in which a quadratic formula of n is in the superscript of the exponential and is divided by sequence length Nzc. Accordingly, a CAZAC sequence of the frequency domain can also be found by using the same method or circuit as the above-described embodiments.

Sixth Embodiment

In the above-described embodiments, examples of configurations were described in which initial value K0 for CAZAC sequence generation is held in an initial value storage memory, but initial value K0 for CAZAC sequence generation need not necessarily be held in a memory. The initial value K0 for CAZAC sequence generation may be supplied from the outside. For example, a DSP (Digital Signal Processor) may calculate initial value (update value) K0 (K1) outside the CAZAC generation circuit and then apply the calculated value as input to R(n) update unit of the CAZAC generation circuit. Processing is otherwise the same as in the above-described embodiments. Sequence generation that is absolutely identical to the above-described embodiments is possible in a configuration of this type. In this case, memory for use in, for example, the arithmetic unit is unnecessary.

Seventh Embodiment

In the embodiments described hereinabove, examples were described in which, in the interest of eliminating exponential operations based on P(n) that is found in a recursion formula, a reference table that holds, for example, cosines (cos) in a trigonometric function value converter, but the present invention does not stipulate the use of such reference tables. In other words, a high-speed trigonometric (cos and sin) arithmetic circuit can be used instead of using a reference table. In forms that use a trigonometric function arithmetic circuit in this way, a configuration for generating P(n) can generate sequence signs as a configuration that is absolutely identical to the previously described embodiments.

Eighth Embodiment

The configurations and operations of the transmission unit of the transmitter and the reception unit of the receiver of the wireless access system that is the eighth embodiment of the present invention are next described in detail. In the present embodiment, explanation regards examples of the configuration of the transmitter of a mobile terminal and the receiver of a base station as examples of application to a single-carrier transmission system.

Single-carrier FDMA is employed in the 3GPP LTE uplink wireless access system. In 3GPP LTE, the transmitter and receiver each use a CAZAC sequence such as a Zadoff-Chu sequence as a reference signal or preamble signal in random access, as previously described.

The generation of a reference signal and preamble signal in the transmitter and receiver of the present embodiment employs a CAZAC sequence generation circuit (method) that was described in each of the previously described embodiments.

Figure 10:
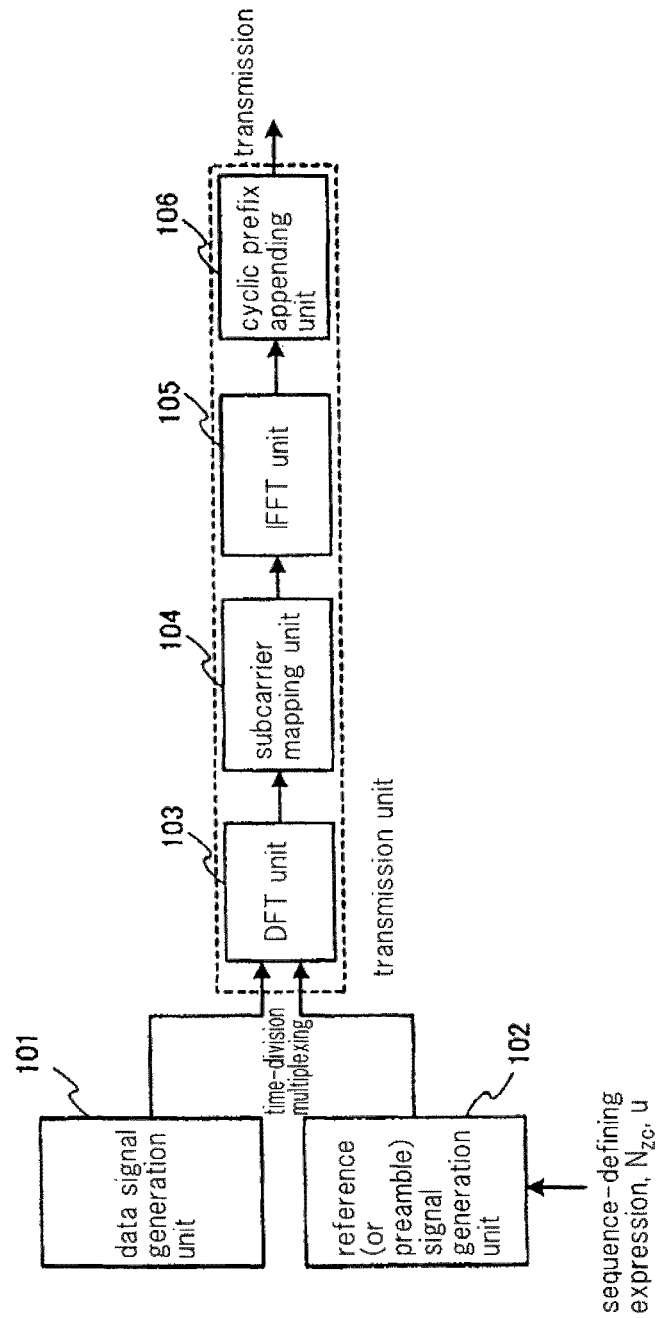
FIG. 10 is a block diagram showing the configuration of the transmitter (transmission unit) of the wireless access system of the eighth embodiment of the present invention.

FIG. 10 shows the configuration of a transmitter (transmission unit) of the present embodiment. As shown in FIG. 10, the transmitter is made up from: data signal generation unit 101, reference signal (or preamble signal) generation unit 102, and a transmission unit. The transmission unit is configured from: DFT (Discrete Fourier Transformation) unit 103, subcarrier mapping unit 104, IFFT (Inverse Fast Fourier Transformation) unit 105, and cyclic prefix appending unit 106. Sequence-defining expressions, sequence length Nzc, and sequence number u for generating CAZAC sequences by, for example, user or channel are set in reference signal (or preamble signal) generation unit 102. The configuration of FIG. 10 is only one example, and a single-carrier transmission system transmitter is not necessarily limited to this type of configuration.

Figure 11:
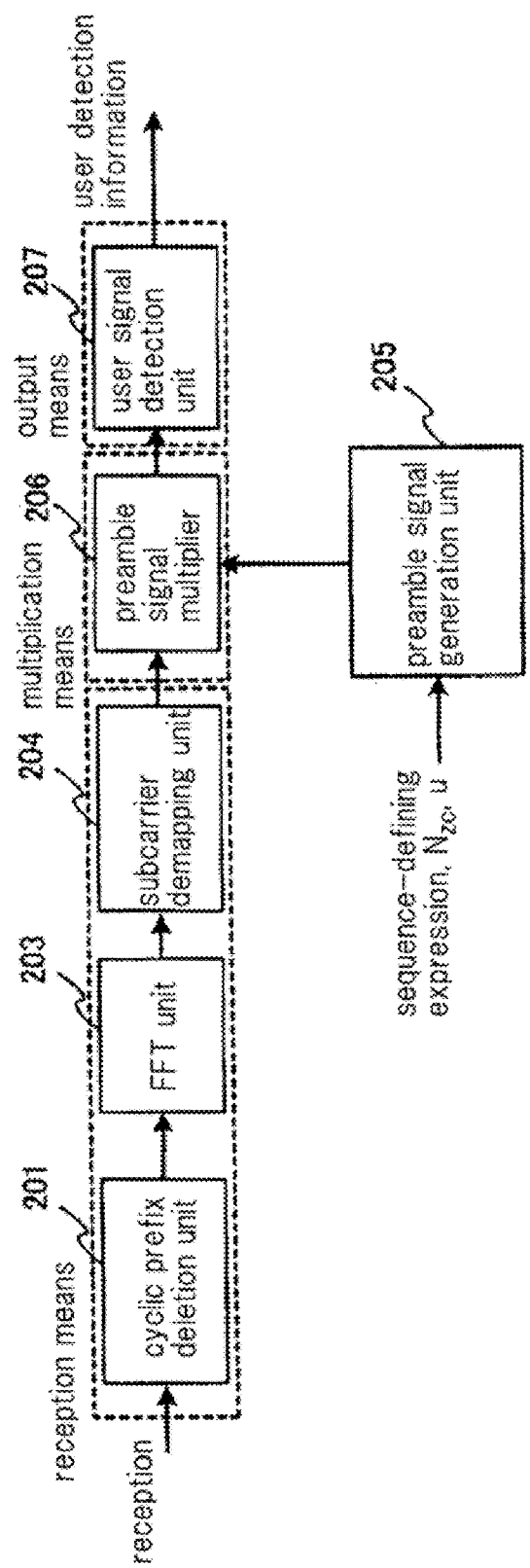
FIG. 11 is a block diagram showing the configuration of the receiver (reception unit) when acquiring random access in the eighth embodiment of the present invention.

FIG. 11 shows the configuration of the receiver (reception unit) for the case of random access reception. As shown in FIG. 11, this receiver is made up from: reception means, multiplication means, output means, and preamble signal generation unit 204. The reception means is made up from: cyclic prefix deletion unit 201, FFT (Fast Fourier Transformation) unit 203, and subcarrier demapping unit 204. The multiplication means is composed of preamble signal multiplier 206. The output means is composed of user signal detection unit 207.

Figure 12:
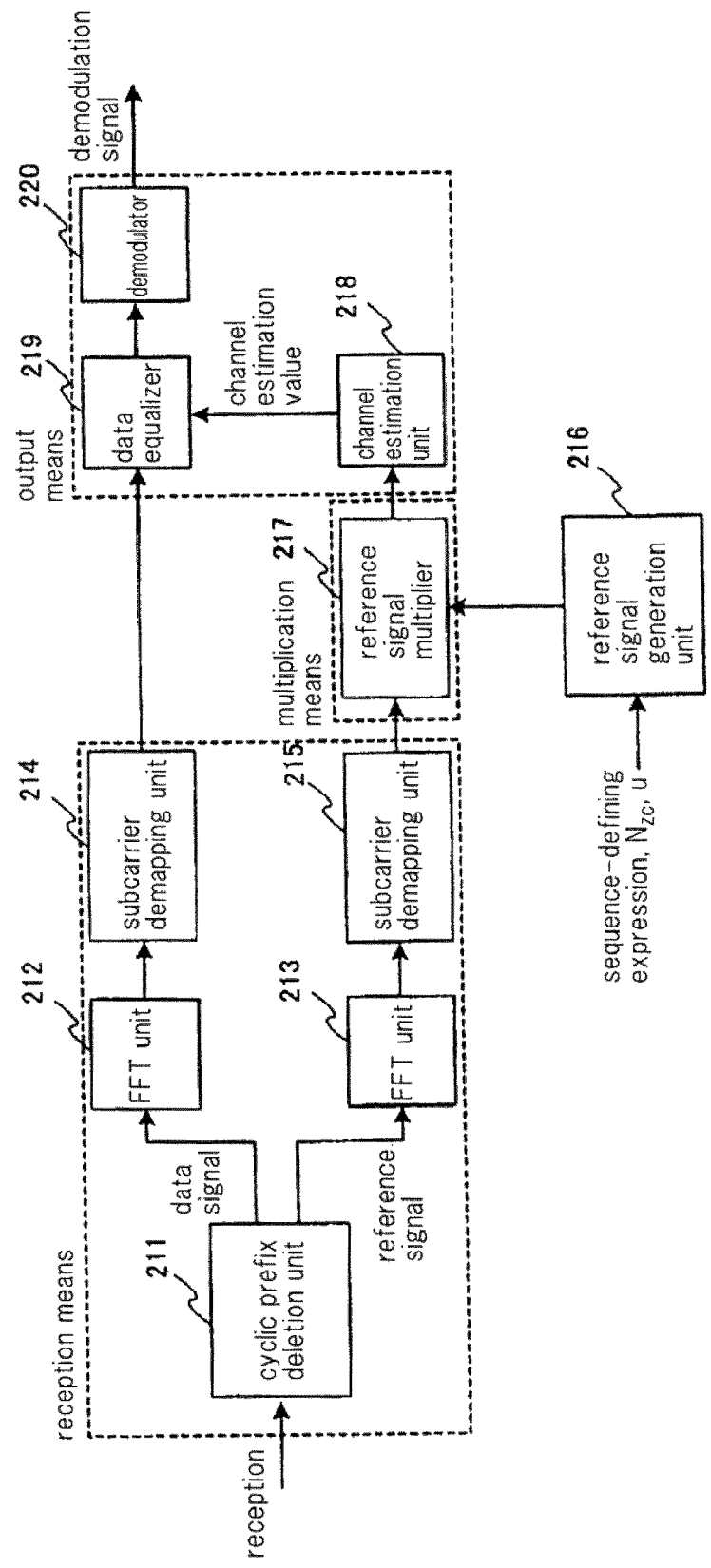
FIG. 12 is a block diagram showing the configuration of the receiver (reception unit) when receiving a data channel in the eighth embodiment of the present invention.

FIG. 12 shows the configuration of the receiver (reception unit) when receiving a data channel. As shown in FIG. 12, this receiver is provided with: reception means, multiplication means, output means, and reference signal generation unit 216. The reception means is made up from: cyclic prefix deletion unit 211, FFT units 212 and 213, and subcarrier demapping units 214 and 215. The multiplication means is made up from a reference signal multiplier 217. The output means is made up from channel estimation unit 218, data equalizer 219, and demodulator 220.

In order to generate a CAZAC sequence that is identical to that generated by the transmitter that is the object of random access, a sequence-defining expression, sequence length Nzc, and sequence number u that are identical to those of the transmitter are set in preamble signal generation unit 205 that is shown in FIG. 11. In order to generate a CAZAC sequence that is identical to that generated by the transmitter of the object of data reception, a sequence-defining expression, sequence length Nzc, and sequence number u that are identical to those of the transmitter are set in reference signal generation unit 216 that is shown in FIG. 12. The configuration shown in FIGS. 11 and 12 are examples, and the single-carrier transmission system receiver is not necessarily limited to this type of configuration.

An example of the operations of the single-carrier transmitter and receiver of the present embodiment is next described.

Explanation is first presented with reference to FIG. 10 regarding the operations for a case of data transmission and a case of random access.

In the case of data transmission, data signal generation unit 101 generates transmission data, and reference signal generation unit 102, based on the sequence-defining expression, sequence length Nzc, and sequence number u that have been given, generates a transmission reference signal that is a CAZAC sequence. The transmission data that are generated by data signal generation unit 101 and the transmission reference signal that is generated by reference signal generation unit 102 are subjected to time division multiplexing and applied as input to DFT unit 103.

DFT unit 103 subjects the time-division multiplexed signal to a discrete Fourier transformation process (DFT). The frequency components after the DFT process are each mapped to subcarriers assigned to each user by each frequency component in subcarrier mapping unit 104. The output signal from subcarrier mapping unit 104 is then subjected to an Inverse Fast Fourier transformation process (IFFT process) in IFFT unit 105. Finally, cyclic prefixes are appended to the IFFT output signal from IFFT unit 105 in cyclic prefix appending unit 106. A signal resulting from the addition of cyclic prefixes to the IFFT output signal is transmitted to the outside from cyclic prefix appending unit 106.

In the case of random access transmission, preamble signal generation unit 102 generates a preamble signal based on the sequence-defining expression, sequence length Nzc, and sequence number u that have been given. The preamble signal that is generated by preamble signal generation unit 102 is subjected to a DFT process in DFT unit 103. Subsequent processing is the same as for data transmission. In other words, the frequency components following the DFT process are each mapped to subcarriers that were assigned to each user by each frequency component in subcarrier mapping unit 104. The output signal from subcarrier mapping unit 104 is then subjected to an Inverse Fast Fourier Transformation process (IFFT process) in IFFT unit 105. Finally, in cyclic prefix appending unit 106, cyclic prefixes are appended to the IFFT output signal from IFFT unit 105. The signal resulting from appending a cyclic prefix to the IFFT output signal is transmitted to the outside from cyclic prefix appending unit 106.

Essentially, the transmission side takes the CAZAC sequence that was generated as a reference signal, subjects this reference signal to time-division multiplexing with the data signal, maps this time-division multiplexed signal to a designated subcarrier as a signal of the frequency domain, takes this mapped signal as a signal of the time domain, and appends a cyclic prefix to this time domain signal and transmits the result. Alternatively, the transmission side takes the CAZAC sequence that was generated as a preamble signal, maps the preamble signal to a designated subcarrier as the signal of the frequency domain, takes the mapped signal as a signal of the time domain, and appends a cyclic prefix to this signal of the time domain and transmits the result.

Explanation next regards operations for the cases of random access reception and data reception with reference to FIGS. 11 and 12, respectively.

In the case of random access reception (see FIG. 11), the sequence-defining expression, sequence length Nzc, and sequence number u that the user uses are set in preamble signal generation unit 205. Preamble signal generation unit 205 then generates a preamble signal that is composed of a CAZAC sequence.

In the operations of random access reception, the cyclic prefix is first deleted in cyclic prefix deletion unit 201. The received signal from which the cyclic prefix has been deleted is then subjected to an FFT process in FFT unit 203. The received signal that has undergone the FFT process is then subjected to subcarrier demapping in subcarrier demapping unit 204.

The received signal following subcarrier demapping and the preamble signal that was generated in preamble signal generation unit 205 are next multiplied in preamble signal multiplier 206. The output (multiplication result) of preamble signal multiplier 206 exhibits a high correlation value when the preamble signal is the same. User signal detection unit 207 detects a user signal based on the output (multiplication result) of preamble signal multiplier 206.

Essentially, in the case of random access reception, the receiver deletes the cyclic prefix from the received signal, takes this signal from which the cyclic prefix has been deleted as a signal of the frequency domain, and implements user detection by means of the result of multiplication of the signal obtained by subcarrier demapping of this signal of the frequency domain and a CAZAC sequence that was generated as a preamble signal of the reception side.

In the case of data reception (see FIG. 12), the sequence-defining expression, sequence length Nzc, and sequence number u that are used by the user are set in reference signal generation unit 216. Reference signal generation unit 216 generates a reference signal that is composed of a CAZAC sequence.

In the operations of data reception, the cyclic prefix is first deleted from the received signal in cyclic prefix deletion unit 211, and the received signal following this deletion is divided into a data signal and a reference signal. The received data signal that has been divided is next subjected to an FFT process in FFT unit 212, and the received reference signal that has been divided is subjected to an FFT process in FFT unit 213.

The data signal that has undergone the FFT process in FFT unit 212 next undergoes subcarrier demapping in subcarrier demapping unit 214. On the other hand, the reference signal that has undergone the FFT process in FFT unit 213 undergoes subcarrier demapping in subcarrier demapping unit 215.

The reference signal that has undergone subcarrier demapping in subcarrier demapping unit 215 is multiplied with a reference signal that was generated by reference signal generation unit 216 in reference signal multiplier 217. Channel estimation unit 218 obtains a channel estimation value from the multiplication result from reference signal multiplier 217.

The data signal that has undergone subcarrier demapping in subcarrier demapping unit 214 is equalized in data equalizer 219 using the channel estimation value from channel estimation unit 218. The data signal that was equalized in data equalizer 219 is demodulated in demodulator 220, and this demodulated signal is supplied from demodulator 220.

Essentially, in the case of data reception, the receiver deletes the cyclic prefix from the received signal, divides the received signal from which the cyclic prefix has been deleted into a data signal and a reference signal, subjects each of the data signal and reference signal that have been divided to subcarrier demapping as signals of the frequency domain, implements channel estimation by means of the result of multiplying the reference signal that has undergone subcarrier demapping and a CAZAC sequence that was generated as a reference signal of the reception side, and, based on the channel estimation value, equalizes and demodulates the data signal that has undergone subcarrier demapping.

Other Embodiments

The processing functions relating to CAZAC sequence generation (circuits and methods) by the recursion formula described in the preceding embodiments can be realized by programs. For example, a program provided with processing functions that are based on the previously described Formula 1 to Formula 14 is stored as a CAZAC sequence generation program and reference table data of trigonometric functions are stored as necessary on ROM 10b and 20b shown in FIG. 3. CPUs 10a and 20a read the CAZAC sequence generation program and, based on, for example, the CAZAC sequence length Nzc and sequence number u that have been set and received as input, use the work area of RAM 10c and 20c to execute processing such as initialization and updating of the previously described variables P(n), P^(n) and R(n) and trigonometric operation functions. CAZAC sequences are thus generated.

Although the present invention has been described hereinabove with reference to embodiments, the present invention is not limited to the above-described embodiments. The configuration and operations of the present invention are open to various modifications within a range that does not depart from the scope of the present invention and that would be readily understood by one of ordinary skill in the art.

What is claimed is:

1. A wireless access system transmitter comprising:
   an arithmetic unit that converts an arithmetic process of a quadratic formula that is contained in an exponent of a CAZAC sequence-defining expression to an arithmetic process of a recursion formula that is obtained according to the periodicity of the CAZAC sequence-defining expression to find said exponent;
   a sequence generation unit that uses said exponent that was found by said arithmetic unit to generate a CAZAC sequence; and
   a transmission unit that transmits said CAZAC sequence that was generated in said sequence generation unit as a reference signal of a data signal or as a random access preamble signal.

2. The transmitter according to claim 1, wherein said sequence generation unit includes a reference unit for holding a reference table showing the correspondence relation between said exponent that is found by said arithmetic unit and trigonometric function values; converts said exponent to a trigonometric function value by referring to said reference table; and uses the trigonometric function value to generate said CAZAC sequence.

3. The transmitter according to claim 2, wherein:
said reference table is provided with table elements that allow reference to trigonometric function values from at least a maximum positive or negative value down to zero; and
said reference unit refers to said reference table to generate trigonometric function values over a range of $2\pi$.

4. The transmitter according to claim 1, wherein: said sequence-defining expression is Formula 1; said arithmetic unit subjects variables R(n), P^(n), and P(n) [n=1, 2, ... $N_{zc}$−1] to initialization shown in Formula 2 and to updating shown in Formula 3; and supplies variable P(n) as said exponent; where:

Formula 1 is:

$$X_u(n) = e^{-j\frac{\pi u n(n)}{N_{zc}}},$$
$$n = 0, 1, \ldots, N_{zc} - 1$$

$N_{zc}$: the sequence length; u: the sequence number; f(n): a quadratic formula relating to n;

Formula 2 is:

P(n) initialization: $P^{\wedge}(0) \leftarrow 0, P(0) \leftarrow 0$

R(n) initialization: $R(0) \leftarrow K0\left(= \frac{m \cdot u}{N_{ZC}} \bmod m\right)$ K0: the initialization value (constant value)
m: the maximum value of P(n);

| Formula 3 is: |
| --- |
| Loop n = 1, 2 ... ($N_{ZC}$ − 1)<br>  P^(n) ← P^(n − 1) + R(n − 1)<br>  if P^(n) ≧ m, then P^(n) ← P^(n) − m<br>  P(n) ← ⌊P^(n)⌋<br>  R(n) ← R(n − 1) + K₁<br>  if R(n) ≧ m, then R(n) ← R(n) − m<br>  n ← n + 1<br>end Loop<br>  ⌊ ⌋ is integer − bit cut − out,<br>  K1 is an update value (constant value)<br><br>$P^{\wedge}(n) = \frac{\frac{m}{2}u}{N_{zc}}f(n).$ |

5. The transmitter according to claim 4, wherein said arithmetic unit uses a modulo m operation by means of a carry-invalidation process for P^(n)≧m and R(n)≧m to carry out an updating process shown in Formula 4 in place of the updating process of said Formula 3; where:

| Formula 4 is: |
| --- |
| Loop n = 1,2...($N_{ZC}$ − 1)<br>  P^(n) ← P^(n − 1) + R(n − 1)<br>  P(n) ← ⌊P^(n)⌋<br>  R(n) ← R(n − 1) + K₁<br>  n ← n + 1<br>end Loop. |

6. The transmitter according to claim 4, wherein said quadratic formula is f(n)=n(n+1), and updating value K1 is K1=K0.

7. The transmitter according to claim 4, wherein, using the symmetry of said CAZAC sequences, the sequence xu(Nzc−t−1), (t<Nzc−1) is generated based on the sequence xu(t) that was generated by said initialization process and said updating process as xu(Nzc−t−1)=xu(t) by substituting the processes.

8. A receiver of a wireless access system, said receiver comprising:
an arithmetic unit that converts an arithmetic process of a quadratic formula that is contained in an exponent of a CAZAC sequence-defining expression to an arithmetic process of a recursion formula that is obtained according to the periodicity of said CAZAC sequence-defining expression to find said exponent;
a sequence generation unit that uses said exponent that was found by said arithmetic unit to generate a CAZAC sequence; and
a reception unit that receives a reference signal of a data signal or a random access preamble signal made up by the same sequence as said CAZAC sequence and that uses said CAZAC sequence that was generated in said sequence generation unit and said reference signal or said random access preamble signal to detect said data signal or a random access user.

9. The receiver according to claim 8, wherein said sequence generation unit: includes a reference unit that holds a reference table showing the correspondence relation between said exponent that is found by said arithmetic unit and trigonometric function values; converts said exponent to a trigonometric function value by referring to said reference table, and uses the trigonometric function value to generate said CAZAC sequence.

10. The receiver according to claim 9, wherein:
said reference table is provided with table elements that allow reference to trigonometric function values from at least a maximum positive or negative value down to zero; and
said reference unit refers to said reference table to generate trigonometric function values over a range of $2\pi$.

11. The receiver according to claim 8, wherein said reception unit includes:
reception means for receiving said reference signal or random access preamble signal;
multiplication means for multiplying said reference signal or random access preamble signal that was received in said reception means and said CAZAC sequence that was generated in said sequence generation unit; and
an output means for, based on output of said multiplication means, equalizing and demodulating said data signal or detecting a random access user.

12. The receiver according to claim 8, wherein said reception means:
includes: a cyclic prefix deletion unit for deleting a cyclic prefix from a received signal and dividing the received signal after this deletion into a data signal and a reference signal, FFT (Fast Fourier Transformation) units for making each of the data signal and reference signal, that have been divided, signals of the frequency domain, and subcarrier demapping units for subjecting each of the outputs of said FFT units to subcarrier demapping; or includes a cyclic prefix deletion unit for deleting a cyclic prefix from a received signal, an FFT unit for making the output of said cyclic prefix deletion unit a signal of the frequency domain, and a subcarrier demapping unit for subjecting the output of said FFT unit to subcarrier demapping.

13. The receiver according to claim 8, wherein said output means:
    includes: a channel estimation unit for supplying a channel estimation value from the output of said multiplication means, a data equalizer for equalizing said data signal by means of output of said channel estimation unit, and a demodulator for demodulating output of said data equalizer; or
    includes a user signal detection unit for detecting a user from output of said multiplication means.

14. The receiver according to claim 8, wherein:
    said sequence-defining expression is Formula 1; said arithmetic unit subjects variables R(n), P^(n), and P(n) [n=1, 2, ..., Nzc−1] to initialization shown in Formula 2 and to updating shown in Formula 3; and supplies variable P(n) as said exponent; where:

Formula 1 is:

$$X_u(n) = e^{-j\frac{\pi u f(n)}{N_{zc}}},$$
$$n = 0, 1, \ldots, N_{zc} - 1$$

$N_{zc}$ is the sequence length; u is the sequence number; and f(n) is a quadratic formula relating to n Formula 2 is:

P(n) initialization: $P^\wedge(0) \leftarrow 0, P(0) \leftarrow 0$

R(n) initialization: $R(0) \leftarrow K0 \left( = \frac{m \cdot u}{N_{ZC}} \bmod m \right)$ K0: the initialization value (constant value)
m: the maximum value of P(n);

Formula 3 is:

Loop n = 1, 2 ... ($N_{ZC}$ − 1)
   P^(n) ← P^(n − 1) + R(n − 1)
   if P^(n) ≧ m, then P^(n) ← P^(n) − m
   P(n) ← ⌊P^(n)⌋
   R(n) ← R(n − 1) + $K_1$
   if R(n) ≧ m, then R(n) ← R(n) − m
   n ← n + 1
end Loop
   ⌊ ⌋ is integer − bit cut − out,
   $K_1$ is an update value (constant value)

$$P^\wedge(n) = \frac{\frac{m}{2}u}{N_{ZC}} f(n).$$

15. The receiver according to claim 14, wherein said arithmetic unit uses a modulo m operation by means of a carry-invalidation process for P^(n)≧m and R(n)≧m to carry out an updating process shown in Formula 4 in place of the updating process of said Formula 3, where:

Formula 4 is:

Loop n = 1,2...($N_{ZC}$ − 1)
   P^(n) ← P^(n − 1) + R(n − 1)
   P(n) ← ⌊P^(n)⌋
   R(n) ← R(n − 1) + $K_1$
   n ← n + 1
end Loop.

16. The receiver according to claim 14, wherein said quadratic formula is f(n)=n(n+1), and updating value K1 is K1=K0.

17. The receiver according to claim 14, wherein, using the symmetry of said CAZAC sequences, the sequence xu(Nzc−t−1), (t<Nzc−1) is generated based on the sequence xu(t) that was generated by said initialization process and said updating process as xu(Nzc−t−1)=xu(t) by substituting the processes.

18. A transmission method of a wireless access system comprising:
    converting an arithmetic process of a quadratic formula contained in an exponent of a CAZAC sequence-defining expression to an arithmetic process of a recursion formula that is obtained according to the periodicity of said CAZAC sequence-defining expression to find said exponent;
    using said exponent that was found in the arithmetic process of said recursion formula to generate a CAZAC sequence; and
    transmitting said CAZAC sequence as a reference signal of a data signal or as a random access preamble signal.

19. The transmission method according to claim 18, wherein a reference table showing the correspondence relation between said exponent that is found by an arithmetic process of said recursion formula and a trigonometric function value is referenced to convert said exponent to a trigonometric function value; and the trigonometric function value is used to generate said CAZAC sequence.

20. A reception method of a wireless access system comprising:
    converting an arithmetic process of a quadratic formula contained in an exponent of a CAZAC sequence-defining expression to an arithmetic process of a recursion formula obtained according to the periodicity of said CAZAC sequence-defining expression to find said exponent;
    using said exponent that was found in the arithmetic process of said recursion formula to generate a CAZAC sequence;
    receiving a reference signal of a data signal or the random access preamble signal that is composed of the same sequence as said CAZAC sequence; and
    using said CAZAC sequence and said reference signal or random access preamble signal to detect said data signal or a random access user.

21. The reception method according to claim 20, wherein a reference table showing the correspondence relation between said exponent that is found by the arithmetic process of said recursion formula and a trigonometric function value is referenced to convert said exponent to a trigonometric function value; and the trigonometric function value is used to generate said CAZAC sequence.

22. A recording medium recoded with a program for causing a computer to execute processes of:
   converting an arithmetic process of a quadratic formula contained in an exponent of a CAZAC sequence-defining expression to an arithmetic process of a recursion formula obtained according to the periodicity of said CAZAC sequence-defining expression to find said exponent;
   using said exponent that was found in the arithmetic process of said recursion formula to generate a CAZAC sequence; and
   transmitting said CAZAC sequence as a reference signal of a data signal or as a random access preamble signal.

23. The recording medium according to claim 22, wherein the process of generating said CAZAC sequence includes a process wherein a reference table showing the correspondence relation between said exponent that is found by the arithmetic process of said recursion formula and a trigonometric function value is referenced to convert said exponent to a trigonometric function value; and the trigonometric function value is used to generate said CAZAC sequence.

24. A recording medium recoded with a program for causing a computer to execute processes of:
   converting an arithmetic process of a quadratic formula that is contained in an exponent of a CAZAC sequence-defining expression to an arithmetic process of a recursion formula that is obtained according to the periodicity of said CAZAC sequence-defining expression to find said exponent;
   using said exponent that was found in the arithmetic process of said recursion formula to generate a CAZAC sequence;
   receiving the reference signal of a data signal or the random access preamble signal that is composed of the same sequence as said CAZAC sequence; and
   using said CAZAC sequence and said reference signal or random access preamble signal to detect said data signal or a random access user.

25. The recording medium according to claim 24, wherein the process of generating said CAZAC sequence includes a process wherein a reference table showing the correspondence relation between said exponent that is found by the arithmetic process of said recursion formula and a trigonometric function value is referenced to convert said exponent to a trigonometric function value; and the trigonometric function value is used to generate said CAZAC sequence.

* * * * *